United States Patent
Kim

(10) Patent No.: US 8,717,623 B2
(45) Date of Patent: May 6, 2014

(54) CONTROLLER CHIP AND IMAGE FORMING APPARATUS TO PERFORM COLOR MIS-REGISTRATION CORRECTION AND METHODS THEREOF

(75) Inventor: Yu-na Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 13/204,746

(22) Filed: Aug. 8, 2011

(65) Prior Publication Data

US 2012/0033240 A1 Feb. 9, 2012

(30) Foreign Application Priority Data

Aug. 6, 2010 (KR) ........................ 10-2010-0076083

(51) Int. Cl.
*H04N 1/60* (2006.01)

(52) U.S. Cl.
USPC .......... 358/1.9; 358/3.24; 358/518; 358/540; 382/167

(58) Field of Classification Search
USPC ........................................................ 358/1.9
See application file for complete search history.

(56) References Cited

U.S. PATENT DOCUMENTS

| 6,549,303 | B1 | 4/2003 | Trask | |
|---|---|---|---|---|
| 2008/0007752 | A1* | 1/2008 | Gandhi et al. | 358/1.9 |
| 2008/0068662 | A1* | 3/2008 | Yamada | 358/3.24 |

FOREIGN PATENT DOCUMENTS

| DE | 19912511 | 9/2000 |
|---|---|---|
| WO | 2007/127239 | 11/2007 |

OTHER PUBLICATIONS

European Search Report Issued on May 11, 2012 in EP Patent Application No. 11176481.7.

* cited by examiner

*Primary Examiner* — Steven Kau
*Assistant Examiner* — Andrew H Lam
(74) *Attorney, Agent, or Firm* — Stanzione & Kim, LLP

(57) ABSTRACT

A method to perform color mis-registration correction in an image forming apparatus includes detecting a plurality of color image data from print data, detecting edge information of each color image pixel for each of the color image data, and comparing the detected edge information and determining whether to perform color mis-registration correction. If it is determined to perform the color mis-registration correction, the method includes comparing a value of a pixel which constitutes each color image and setting a correction value, and if a correction value for entire pixels of the each color image is set, performing color mis-registration correction for the plurality of color image data according to the set correction value. Accordingly, color mis-registration correction may be performed effectively and stably.

25 Claims, 16 Drawing Sheets

FIG. 5

| Type | Gradient Direction | | Example |
|---|---|---|---|
| 0 | → | → | |
| 1 | ↗ | ↗ | |
| 2 | ↗ | → | |
| 3 | ↗ | ↘ | |
| 4 | → | ↗ | |
| 5 | → | ↘ | |
| 6 | ↘ | ↗ | |
| 7 | ↙ | → | |
| 8 | ↙ | ↙ | |

(a)  + 
ch1    ch2

(b) 
ch1    ch2

(c)  + 
ch1    ch2

(d)  + 
ch1    ch2

CONTROLLER CHIP AND IMAGE FORMING APPARATUS TO PERFORM COLOR MIS-REGISTRATION CORRECTION AND METHODS THEREOF

CROSS-REFERENCE TO RELATED APPLICATIONS

This application claims the benefit of priority to Korean Patent Application No. 2010-0076083, filed in the Korean Intellectual Property Office on Aug. 6, 2010, the contents of which are incorporated herein by reference in their entirety.

BACKGROUND

1. Field of the Invention

The present general inventive concept relates to a controller chip and an image forming apparatus which perform color mis-registration correction and methods thereof, and more particularly, to a controller chip and an image forming apparatus which perform color mis-registration correction by analyzing edge of color image data and correcting software of the color image data and methods thereof.

2. Description of the Related Art

With the development of electronic technology, not only a computer but also various kinds of image forming apparatuses have been widely distributed.

An image forming apparatus refers to an apparatus which forms an image on various mediums such as a paper. Examples of image forming apparatuses include a printer, a copier, a scanner, a fax machine, and a multi-functional printer.

In the case of a printer, in recent years, more and more people use a laser printer which has better printing quality, printing speed, and less printing noise than a dot-matrix printer and an inkjet printer that have been widely used conventionally. A laser printer applies toner to a photo conductor using laser beam which is converted into a picture signal, transfers the toner applied to the photo conductor to a printing paper, and fuses the toner on the printing paper by high pressure and heat.

The laser printer prints an image through charging, writing, developing, transferring, and fusing. Charging represents a process of forming a negative (−) electric charge on the surface of a photo conductor as a result of Corona charging by applying high voltage (approximately 7000V) to a charging unit. Writing represents a process of forming a latent image by scanning a laser beam on the surface of the photo conductor where the negative (−) electric charge is formed, thereby extinguishing the negative (−) electric charge to form a shape, such as a letter, with the space that does not include the negative (−) charge. The portion of the photo conductor on which the negative (−) charge has been extinguished is a latent image. Developing is a process of attaching toner particles having a negative (−) charge to the latent image on the surface of the photo conductor. Transferring is a process of forming a positive (+) electric charge on the other side of a paper by applying a predetermined transfer voltage to a transferring unit while the paper is passing between the photo conductor and the transferring unit, thereby transferring the negative (−) toner particles on the surface of the photo conductor in the direction of the paper. Fusing is a process of applying heat and pressure to the paper to bond the toner particles to the paper. After going through the above processes, the image is formed on the paper and the paper is output from the printing device.

Recently, color laser printers have been developed to perform color printing using a laser printing method. Color laser printers use toners of four colors, that is, cyan (C), Magenta (M), Yellow (Y), and black (K), to reproduce a color image. In this case, four photo conductors are used to perform printing by each toner color in order to print a clear image.

In order to reproduce such a color image, toners should be overlapped with each other precisely on the same position using a plurality of photo conductors, developing units, and transferring units. However, as the number of printing papers increases, operation errors may occur between the developing units and the transferring units, causing the location of the toners to vary from their original position. Accordingly, color rids-registration may occur, blurring the edge of the color image. Conventionally, hardware fixes have been employed to correct such color mis-registration. That is, a test image is printed and the pattern of the test image is analyzed. Subsequently, color mis-registration is corrected by adjusting an operation time of a transferring unit and so forth based on the analysis. However, if this method is used, toners and papers are inevitably wasted.

Therefore, there is a need for technology to correct color mis-registration in more effective way.

SUMMARY

The present general inventive concept provides a controller chip and an image forming apparatus and methods thereof which correct color mis-registration effectively by correcting color image data itself using information regarding an edge between the color image data.

Additional aspects and utilities of the present general inventive concept will be set forth in part in the description which follows and, in part, will be obvious from the description, or may be learned by practice of the present general inventive concept.

A method of performing color mis-registration correction in an image forming apparatus may include detecting a plurality of color image data from print data, detecting edge information of each color image pixel for each of the color image data, analyzing the detected edge information and determining whether to perform color mis-registration correction. The method further comprises, if it is determined that the color mis-registration correction should be performed, comparing a value of a pixel which constitutes each color image and setting a correction value, and if correction values for entire pixels of the each color image are set, performing color mis-registration correction for the plurality of color image data according to the set correction values.

Detecting the edge information may include generating a window in a predetermined size, which has a pixel of one of each color image as a central pixel, and generating the edge information by checking information regarding location, direction, and type of edge included in the window according to difference between the central pixel and a surrounding pixel in the window.

The edge information may include information regarding an edge location which indicates where the edge is located, information regarding a direction which indicates a direction where the edge is generated, and information regarding an edge type which indicates an edge gradient in the window.

Performing the color mis-registration correction may include extending a color image corresponding to the surrounding pixel in a direction of the central pixel by as much as one pixel.

Determining whether to perform the color mis-registration correction may include determining to perform the color mis-registration correction if there are at least two color images of which edges directions are opposite.

Generating the window may include generating a window which has a pixel in a same location with respect to each of the at least two color images as a central pixel, and the setting a correction value may include comparing a value of a central pixel in a window generated in at least one first color image from among the at lest two color images with a value of a surrounding pixel in an edge of a window generated in the other second color image from among the at least two color images. In addition, the method may include, if the central pixel value is bigger than the surrounding pixel value, setting the surrounding pixel value as the correction value, if the central pixel value is smaller than the surrounding pixel value and difference is a same as or less than a predetermined threshold value, setting the central pixel value as the correction value, and if the central pixel value is smaller than the surrounding pixel value and difference exceeds the threshold value, determining not to perform correction for the central pixel.

Features and/or utilities of the present general inventive concept may also include an engine unit to perform an image forming job and a controller unit to perform color mis-registration correction by correcting a plurality of color image data detected from print data and to provide the corrected color image data to the engine unit. The controller unit may include a conversion unit to detect the plurality of color image data from the print data, an edge detection unit to detect edge information for a pixel of each color image, a controller to determine whether to perform color mis-registration correction by comparing the detected edge information and to set a correction value by comparing a value of a pixel which constitutes each color image, and a correction unit to correct at least one color image data from among the plurality of color image data according to the set correction value if a correction value for entire pixels of the each color image is set.

The edge detection unit may include a window generation unit to generate a window in a predetermined size, which has a pixel of one of each color image as a central pixel, an edge information generation unit to generate the edge information by checking information regarding the location, direction, and type of an edge included in the window according to difference between the central pixel and a surrounding pixel in the window, and a storage unit to store the generated edge information.

The edge information may include information regarding an edge location which indicates where edge is located, information regarding a direction which indicates a direction where an edge is generated, and information regarding an edge type which indicates an edge gradient in the window.

The controller may determine to perform the color mis-registration correction if there are at least two color images having edges that are in contact with each other and edge directions that are opposite to each other.

The correction unit may perform color mis-registration correction by extending a color image corresponding to the surrounding pixel in a direction of the central pixel by as much as one pixel.

The window generation unit may generate a window which has a pixel in a same location with respect to each of the at least two color images as a central pixel.

The controller may include a comparison unit to compare a value of a central pixel in a window generated in at least one first color image from among the at least two color images with a value of a surrounding pixel in an edge of a window generated in the other second color image from among the at least two color images and a setting unit to, if the central pixel value is bigger than the surrounding pixel value, set the surrounding pixel value as the correction value, if the central pixel value is smaller than the surrounding pixel value and difference is a same as or less than a predetermined threshold value, set the central pixel value as the correction value, and if the central pixel value is smaller than the surrounding pixel value and difference exceeds the threshold value, determine not to perform correction for the central pixel.

Features and/or utilities of the present general inventive concept may also be realized by a controller chip including an edge detection unit to detect edge information for each pixel of a plurality of color images represented by the plurality of color image data, a controller to determine whether to perform color mis-registration correction by comparing the detected edge information and set a correction value by comparing a value of a pixel which constitutes each color image, and a correction unit to correct at least one color image data from among the plurality of color image data according to the set correction value if a correction value for entire pixels of each of the plurality of color images is set.

The edge detection unit may include a window generation unit to generate a window in a predetermined size, which has a pixel of one of each color image as a central pixel, an edge information generation unit to generate the edge information by checking information regarding the location, direction, and type of an edge included in the window according to difference between the central pixel and a surrounding pixel in the window, and a storage unit to store the generated edge information.

The edge information may include information regarding an edge location which indicates where the edge is located, information regarding a direction which indicates a direction where the edge is generated, and information regarding an edge type which indicates an edge gradient in the window.

The controller may determine to perform the color mis-registration correction if there are at least two color images having edges are in contact with each other and edge directions that are opposite to each other.

The window generation unit may generate a window which has a pixel in a same location with respect to each of the at least two color images as a central pixel, and the controller may include a comparison unit to compare a value of a central pixel in a window generated in at least one first color image from among the at lest two color images with a value of a surrounding pixel in an edge of a window generated in the other second color image from among the at least two color images. The window generation unit may also include a setting unit to, if the central pixel value is greater than the surrounding pixel value, set the surrounding pixel value as the correction value, if the central pixel value is less than the surrounding pixel value and difference is a same as or less than a predetermined threshold value, set the central pixel value as the correction value, and if the central pixel value is less than the surrounding pixel value and difference exceeds the threshold value, determine not to perform correction for the central pixel.

Features and/or utilities of the present general inventive concept may also be realized by a computer-readable medium to store code to execute a method of color mis-registration correction, the method including detecting edge information of each color image pixel for each of a plurality of color images, comparing the detected edge information and determining whether to perform color mis-registration correction. The method may further include, if it is determined to perform the color mis-registration correction, comparing a value of a pixel which constitutes each color image and setting a correction value, and if correction values for entire pixels of each of the plurality of color images are set, performing color mis-registration correction for at least one color image from among the plurality of color images according to the set correction values.

Features and/or utilities of the present general inventive concept may also be realized by a method of performing mis-registration correction, the method including generating from image data a window having a plurality of pixels, the image data including image data of a plurality of colors such that combined color images of the respective plurality of colors make up the image data, comparing edge information of at least two different colors of the plurality of colors in the window, and performing mis-registration correction on at least one pixel of at least one of the different colors when the compared edge information indicates mis-registration.

Comparing the edge information may include comparing a value of a base pixel in the window with a value of an adjacent pixel of a different color.

The base pixel and the adjacent pixel may each be located on edges of different colors.

The compared edge information may include at least one of an edge location, a direction of an edge, and a type of an edge.

Mis-registration correction may be performed on the at least one pixel when it is determined that two different colors have edges that contact each other and the edges face opposite directions.

Performing mis-registration correction may include setting a value of the adjacent pixel as a correction value at which to set the base pixel when the base pixel value is greater than the adjacent pixel value, setting the base pixel value as the correction value at which to set the adjacent pixel value when the base pixel value is less than the adjacent pixel value and a difference between the base pixel value and the adjacent pixel value is the same as or less than a predetermined threshold value, and determining not to perform mis-registration correction when the base pixel value is less than the adjacent pixel value and a difference between the base pixel value and the adjacent pixel value exceeds the threshold value.

Each of the base pixel value and the adjacent pixel value may correspond to a respective color density.

Features and/or utilities of the present general inventive concept may also be realized by a mis-registration correction apparatus including an edge detection unit to generate from image data a window having a plurality of pixels, the image data including image data of a plurality of colors such that combined color images of the respective plurality of colors make up the image data, and to compare edge information of at least two different colors of the plurality of colors in the window, and a correction unit to perform mis-registration correction on at least one pixel of at least one of the two different colors when the compared edge information indicates mis-registration.

The edge detection unit may compare a value of a base pixel located at an edge of one color in the window with a value of an adjacent pixel located at an edge of a different color.

The edge detection unit may compare at least one of an edge location, a direction of an edge, and a type of an edge of the two different colors.

The correction unit may perform mis-registration correction when it is determined that the two different colors have edges that contact each other and face opposite directions.

The correction unit may set a value of the adjacent pixel as a correction value at which to set the base pixel when the base pixel value is greater than the adjacent pixel value, may set the base pixel value as the correction value at which to set the adjacent pixel value when the base pixel value is less than the adjacent pixel value and a difference between the base pixel value and the adjacent pixel value is the same as or less than a predetermined threshold value, and may determine not to perform misregistration correction when the base pixel value is less than the adjacent pixel value and a difference between the base pixel value and the adjacent pixel value exceeds the threshold value.

Each of the base pixel value and the adjacent pixel value may correspond to a respective color density.

Features and/or utilities of the present general inventive concept may also be realized by a printing apparatus including an image-forming unit to generate an image having a plurality of colors on a printing medium and a mis-registration correction apparatus. The mis-registration correction apparatus may include an edge detection unit to generate from image data a window having a plurality of pixels, the image data including image data of the plurality of colors such that combined color images of the respective plurality of colors make up the image data, and to compare edge information of at least two different colors of the plurality of colors in the window and a correction unit to perform mis-registration correction on at least one pixel of at least one of the two different colors when the compared edge information indicates mis-registration, and to output the corrected image data to the image-forming unit.

As described above, according to various exemplary embodiments, color mis-registration correction may be performed appropriately by correcting software of the color image data in consideration of an edge of a color image.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 5 is a view illustrating an example of type information from among edge information;

DETAILED DESCRIPTION OF THE EMBODIMENTS

Figure 1:
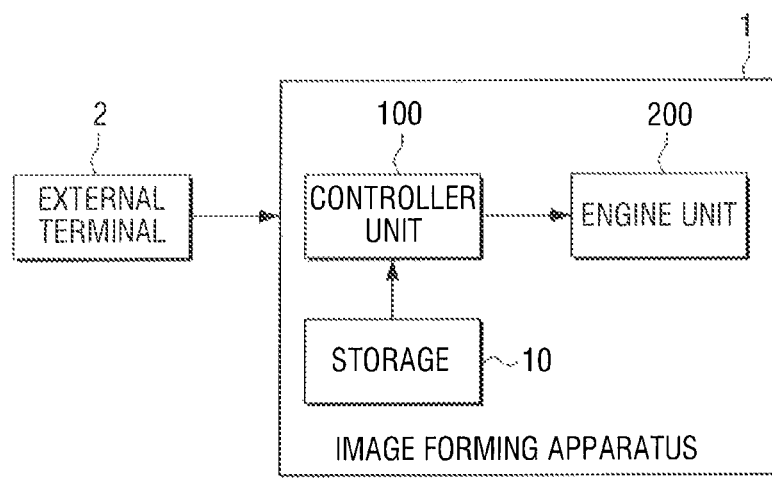
FIG. 1 is a block diagram illustrating configuration of an image forming apparatus according to an exemplary embodiment.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating configuration of an image forming apparatus 1 according to an exemplary embodiment. Referring to FIG. 1, an image forming apparatus 1 comprises a controller unit 100 and an engine unit or image forming unit 200.

The controller unit 100 may receive print data from an external terminal apparatus 2 connected through local interface or network, or read out print data pre-stored in memory 10 of the image forming apparatus 1. The controller unit 100 converts the print data into a data format which can be processed by the engine unit 200 and provides the converted print data to the engine unit 200.

The engine unit 200 performs a job of forming an image on a medium such as a paper according to the data provided from the controller unit 100.

The engine unit 200 may comprise various types of components depending on the type of the image forming apparatus. For example, if the image forming apparatus is a laser type apparatus, the engine unit 200 may comprises charging unit, laser scanning unit, photo conductor, developing unit, transferring unit, and fusing unit. The engine unit 200 may further comprise an engine controller which directly controls operation of the above components. Since the configuration and operation of the engine unit 200 is the same as those of a conventional image forming apparatus, detailed explanation will not be provided.

The controller unit 100 detects a plurality of color image data from print data. If the print data has already been converted into a plurality of color image data in an external terminal apparatus before being transmitted, the controller unit 100 may immediately divide and use each of the color image data. If the print data is transmitted without being converted into a plurality of color image data, the controller unit 100 may convert the print data and detect a plurality of color image data. Specifically, the controller unit 100 may convert the image to CMYK images using a postscript method.

The plurality of color image data represents each data processed by a developing unit and a transferring unit formed in the engine unit 200. For example, if there is a plurality of developing units and transferring units to realize colors of Cyan, Magenta, Yellow, and Black, the controller unit 100 detects image data of C, M, Y, K from print data.

Once a plurality of color image data is detected as described above, the controller unit 100 detects edge information of color image pixel of each color image data. The edge information may be information regarding location, direction, and type of an edge. The method of detecting edge information will be explained later in greater detail.

As described above, if edge information is detected, the controller unit 100 analyzes the detected edge information to determine whether to correct color mis-registration. If it is decided to perform color mis-registration correction, the controller unit 100 compares a partial pixel value of each color image and sets a correction value.

The controller unit 100 performs the operation of detecting edge information, determining whether to perform color mis-registration correction, comparing a pixel value, and setting a correction value sequentially for entire pixels of each color image data.

If a correction value is set for the last pixel, the controller unit 100 corrects each color image data according to the set correction value. Specifically, a single color image pixel is extended from edge between each color image. In this case, only part of color image data is extended by comparing pixel values of surrounding colors, and thus image quality degradation due to excessive correction may be prevented. Consequently, white—gap or halo effect between edges may be corrected while minimizing color overlapping.

In addition, the controller unit 100 may reduce the burden of operation by comparing a central pixel with only some of surrounding pixels. This will be explained later in greater detail.

The controller unit 100 transmits corrected color image data to the engine unit 200. Each color developing unit and transferring unit in the engine unit 200 performs a job of forming an image using the transmitted color image data.

Figure 2:
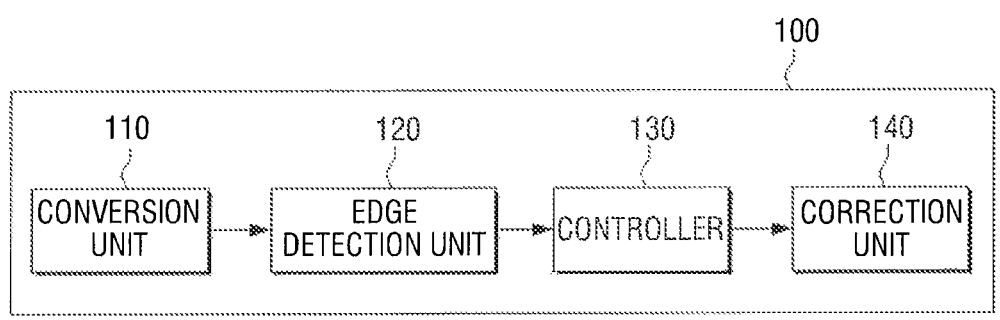
FIG. 2 is a block diagram illustrating configuration of a controller unit according to an exemplary embodiment.

FIG. 2 is a block diagram illustrating configuration of the controller unit 100 according to an exemplary embodiment. The controller unit 100 may be realized as a single controller chip.

Referring to FIG. 2, the controller unit 100 comprises a conversion unit 110, an edge detection unit 120, a controller 130, and a correction unit 140.

The conversion unit 110 detects a plurality of color image data from print data which is received from an external terminal apparatus or read out from an internal/external memory (not shown).

The edge detection unit 120 generates edge information by applying a window to each pixel of the detected color image data and checking whether there is edge in the window. The edge detection unit 120 may be realized to have the configuration illustrated in FIG. 3.

Figure 3:
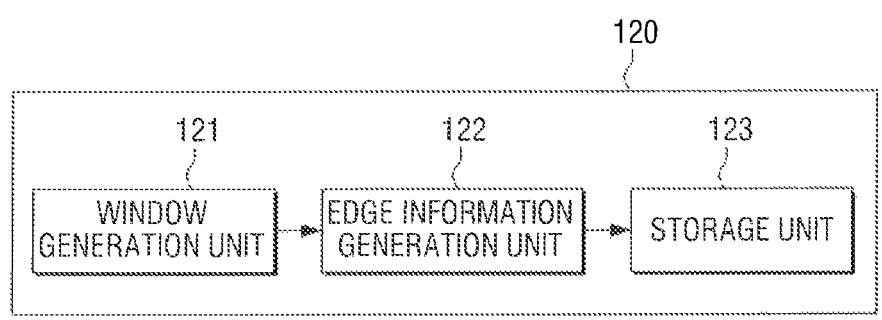
FIG. 3 is a block diagram illustrating an example of configuration of an edge detection unit.

FIG. 3 is a block diagram illustrating an example of configuration of the edge detection unit 120. Referring to FIG. 3, the edge detection unit 120 comprises a window generation unit 121, an edge information generation unit 122, and a storage unit 123.

The window generation unit 121 generates a window in a predetermined size, which has each pixel of each color image as a central pixel.

Figure 4:
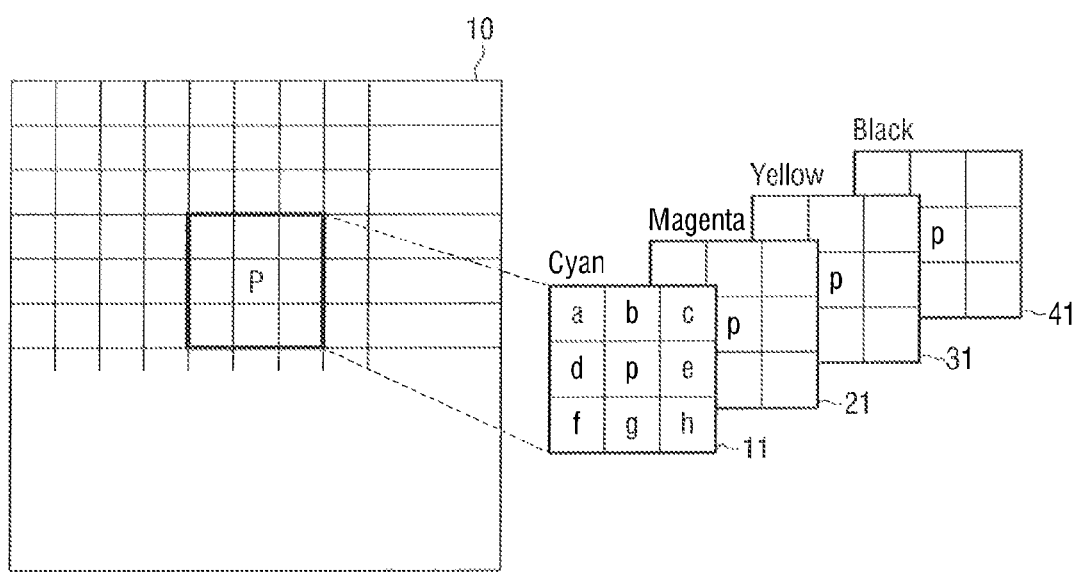
FIG. 4 is a view illustrating that a window is applied to a plurality of color images.

FIG. 4 shows size and shape of a window applied to each color image. Referring to FIG. 4, the window has the size of 3×3, but the size of the window is not limited thereto. That is, the window generation unit 121 may generate a window having a bigger size such as 5×5 and 7×7. In this case, only the values of pixels which are pre-determined distance apart from each other are checked and thus a burden of operation may be reduced. In addition, the generated window may not have a regular square shape, and instead it may have a right-angled tetragon.

Referring to FIG. 4, four windows 11, 21, 31, 41 which have a pixel on the same position of each of color image C, M, Y, K as a central pixel are generated.

While the terms "central pixel" and "surrounding pixel" are used throughout the specification and claims, the present general inventive concept is not limited only to a central pixel. For example, any pixel located at an edge may be used as the central, base, or primary pixel and any pixel next to the base pixel may be considered the surrounding, adjacent, or secondary pixel.

Meanwhile, the edge information generation unit 122 generates edge information by checking location, direction, and type of edge included in the window based on the differences between the central pixel and its surrounding pixels in the generated window.

The edge information may include edge location information which indicates on which part the edge is located, direction information which indicates the direction where the edge is generated, and type information which indicates gradient change of the edge in the window.

The edge location information may indicate various kinds of edge location, including four direction edge where only a central pixel has color, single-line edge where only one line including a central pixel has color, and up, down, left, right, upper left, lower left, upper right, lower right edge. The edge location may be classified according to a direction from pixels with color to pixels without color. The edge location information may indicate location of edge with respect to a central pixel.

The direction information indicates whether edge is in a vertical direction or in a horizontal direction.

According to the type information, there could be a plurality of types of edge depending on gradient of edge which exists in a up, down, left, or right direction with respect to a current central pixel.

Figure 5:
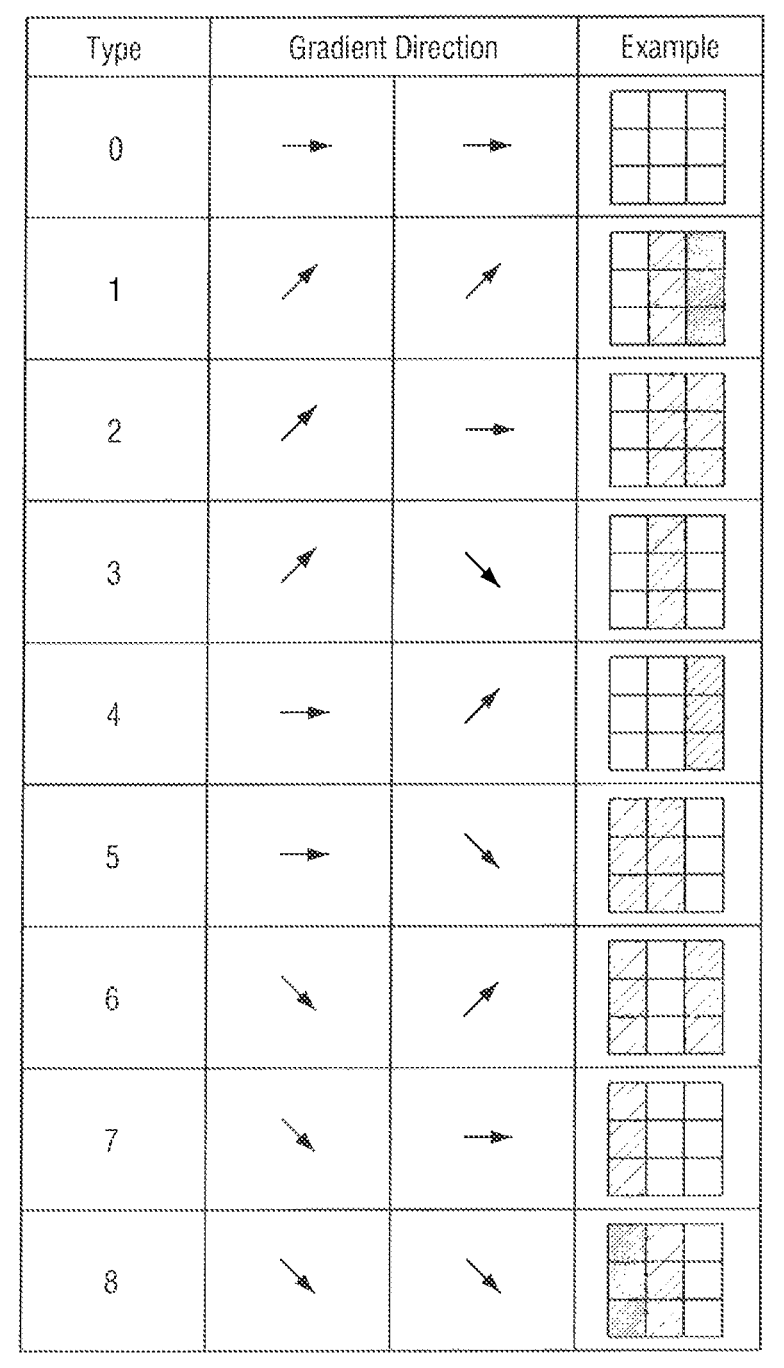

FIG. 5 is a view illustrating an example of type information from among edge information. Referring to FIG. 5, there could be a total of nine types of edge in a vertical direction in a 3×3 window. In this case, type '0' means that there is no edge.

Each window in FIG. 5 is consisted of three vertical lines, and two arrows indicating a gradient direction represents change in a pixel value between the first line (that is, left line) and the second line (that is, middle line) and between the second line and the third line (that is, right line) respectively.

In FIG. 5, the direction of each arrow may be represented as one of ↗, →, ↘ according to direction of change in scale of a pixel value. For example, in type 1, a pixel value gradually increases from the left line to the middle line and to the right line, and thus, both of the two arrows are represented as ↗. In type 2, a pixel value increases from the left line to the middle line and does not change from the middle line to the right line, and thus two arrows are represented as ↗, →. As such, there could be various types according to change of a pixel in a window.

In FIG. 5, only edge in a vertical line direction is classified, but edge in a horizontal line direction may also be classified in the same way. In this case, each type may be determined according to a gradient direction as illustrated in FIG. 5, and whether the edge is in a vertical line direction or a horizontal line direction may be defined in the direction information.

The storage unit 123 may store various edge information generated through the above processes. The arrows in FIG. 5 are illustrated for convenience of explanation, and an actual gradient direction may be represented as a digital code value. That is, the arrows, ↗, →, ↘ may be stored as a code such as 01, 11, 10. Alternatively, more than three bit values may be combined and stored as a code to represent two arrows together.

Referring back to FIG. 2, the controller 130 compares generated edge information and determines whether to perform color mis-registration correction of a corresponding pixel. For example, the controller 130 may determine to perform color mis-registration correction if one color, that is, the edge location information of a first channel is right, the edge direction information is vertical, and the type information is 5 while the edge location information of a second channel is left, the edge direction information is vertical, and the type information is 4. The terms "right" and "left" with respect to the edges refer to a direction of decreasing color density. For example, if a color has pixels of a high density to the left and an edge on the right, then the edge direction is determined to be "right."

Specifically, the controller 130 determines to perform color mis-registration correction if there are more than two color images of which edge direction is opposite in a window. In this case, edges contacting with each other may also be a condition for performing color mis-registration correction. That is, the controller 130 may determine to perform color mis-registration correction except for the case where more than two color images from among a plurality of color images such as C, M, Y, K do not have edges in an opposite direction with each other or the case where edge type is '0'.

Figure 6:
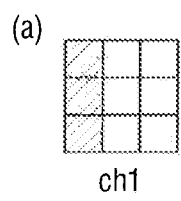
FIG. 6 is a view illustrating an example of edge where color mis-registration correction is to be performed.
Figure 6:
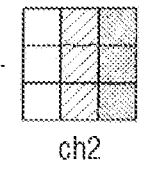
Figure 6:
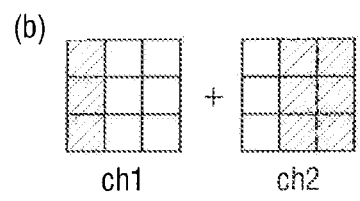
Figure 6:
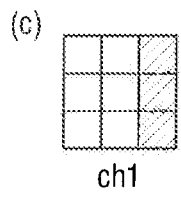
Figure 6:
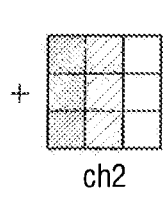
Figure 6:
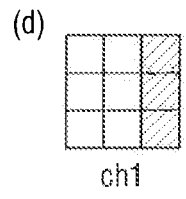
Figure 6:
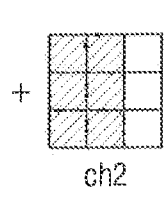

FIG. 6 is a view illustrating several examples which require color mis-registration correction. In FIG. 6, only two channels from among a plurality of color image channels such as C, M, Y, K are illustrated. According to (a) in FIG. 6, only the left line of channel 1 has color and the middle line and the right line have no color, and thus the edge direction shows rightward direction. On the other hand, the color density of channel 2 is getting lower in a direction from the right line to the left line, and thus the edge direction shows leftward direction. In (a) of FIG. 6, the edges of channel 1 and channel 2 contact with each other between the left line and the middle line. Accordingly, in the case of (a) of FIG. 6, the controller 130 determines to perform color mis-registration correction.

In (b) of FIG. 6, channel 1 faces rightward direction and channel 2 faces leftward direction, in (c) of FIG. 6, channel 1 faces leftward direction and channel 2 faces rightward direction, and in (d) of FIG. 6, channel 1 faces leftward direction and channel 2 faces rightward direction. If the edge direction is opposite and edges are in contact with each other as in (a) to (d) of FIG. 6, the controller 130 determines to perform color mis-registration correction. Even if it is not illustrated in FIG. 6, the controller 130 determines to perform color mis-registration correction as long as an edge direction is opposite and the edges are in contact with each other.

Accordingly, if it is determined to perform color mis-registration correction, the controller 130 sets a correction value by comparing a corresponding pixel with the pixel of other color images. The controller 130 selects surrounding pixels to be compared with according to the edge direction.

Figure 7:
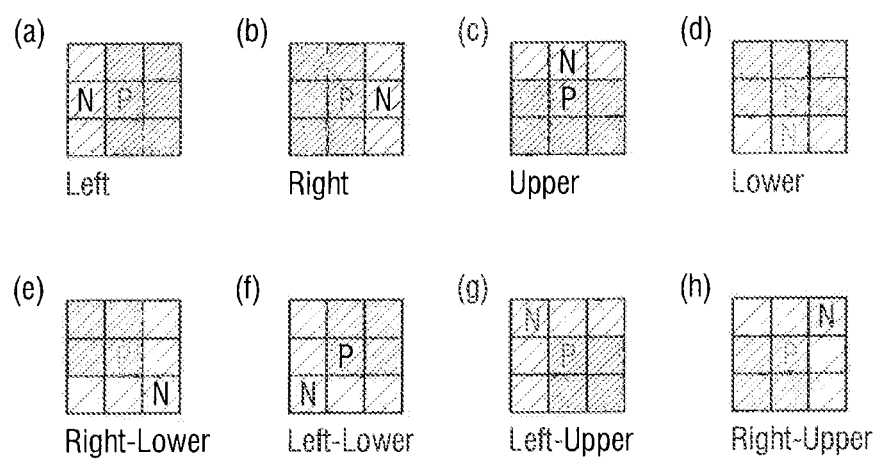
FIG. 7 is a view illustrating an example of a method for selecting a central pixel and surrounding pixels for comparison based on an edge direction.

FIG. 7 illustrates various examples of selecting surrounding pixels according to an edge direction. According to (a) in FIG. 7, if an edge is a left edge, the central pixel P of the first color image and the left pixel N of the second color image are selected as pixels to be compared with. Herein, N refers to a pixel which exists in the left of a central pixel on a window which is generated on the same position. In other words, as illustrated in FIG. 4, a window of nine pixels may be centered around a center pixel P, a sub-window may be generated for each separate color C, M, Y, and B, and the edges of the colors in the sub-windows may be compared to each other to perform misregistration analysis and correction.

According to (b) in FIG. 7, if an edge is a right edge, the central pixel P of the first color image and the right pixel N of the second color image are selected as pixels to be compared with. Similarly, the central pixel P and the surrounding pixel N are selected as pixels to be compared with in (c) to (h) in FIG. 7.

In FIG. 7, (a) to (d), the central pixel P is compared to an immediately adjacent pixel in a horizontal or vertical direction. In other words, the central pixel P is compared to an adjacent pixel N sharing a side with the central pixel P. However, if the central pixel P of the window is located at a corner of a color, then the central pixel P may be compared with an adjacent pixel N that shares a corner with the central pixel P, as in FIG. 7, (e) to (h).

As such, the controller 130 may select one of surrounding pixels which has a different color from a central pixel as a comparison target. In particular, the controller 130 does not select all of the surrounding pixels in an edge area as the comparison target, and instead selects only one surrounding pixel in an edge direction with respect to a central pixel. Accordingly, the burden of operation may be minimized.

The controller 130 sets a correction value by comparing a selected central pixel with a pixel value of a surrounding pixel, that is, by comparing color density of the two pixels. The density may be calculated using the following equation:

$$D=(255-\text{Cyan})*\text{Weight\_}C+(255-\text{Magenta})*\text{Weight\_}M+(255-\text{Yellow})*\text{Weight\_}Y+(255-\text{Black})*\text{Weight\_}K \quad \text{[Equation 1]}$$

In Equation 1, Cyan, Magenta, Yellow, and Black refer to values of C, M, Y, and K of a central pixel and a surrounding pixel, and Weight_C, Weight_M, Weight_Y, and Weight_K refer to weighted values of C, M, Y, and K. If correction is performed when conditions are equal, weighted values may be set as 1:1:1:1. Meanwhile, more weighted value may be added to Y since Y has less discriminative power than other colors. Since the value of other colors is '0' in each color image, the controller 130 may calculate 'D' value of a central pixel and a surrounding pixel respectively using the Equation 1.

If the value of the central pixel is bigger than the value of the surrounding pixel, the controller 130 sets the value of the surrounding pixel as a correction value. On the other hand, if the value of the central pixel is smaller than the value of the surrounding pixel, the controller 130 compares the difference with a threshold value. If it is determined that the difference is the same as or less than the threshold value based on the comparison, the value of the central pixel is set as a correction value. On the other hand, if it is determined that the difference exceeds the threshold value, correction is not performed for the central pixel of a corresponding color image. The process of calculating a correction value may be summed up in the following algorithm:

(Algorithm)

if $(D_P > D_N)$ $\text{TRAP}_C = N_C$ $\text{TRAP}_Y = N_Y$ else if $(D_P \leq D_N$ and $(D_N - D_P) < TH)$ $\text{TRAP}_C = N_C + \text{ADD\_}C$ $\text{TRAP}_Y = N_Y + \text{ADD\_}Y$ else $\text{TRAP}_C = \text{TRAP}_C$ $\text{TRAP}_Y = \text{TRAP}_Y$ According to the above algorithm, TRAP is a correction value and represents an extension of a color from a surrounding pixel N into the central pixel P. As discussed below, the density of the correction value TRAP, or the density of the color from the surrounding pixel N that extends into the central pixel P, may be adjusted according to the above formula. If the density $D_P$ of a central pixel is greater than the density $D_N$ of a surrounding pixel, the correction value TRAP is extended while maintaining the density of the surrounding pixel. In other words, if NC and NY correspond to Cyan and Yellow colors of the surrounding pixel, then the C and Y colors are extended toward the central pixel and the density of the colors C, Y in the central pixel is maintained the same as that of the colors C, V in the surrounding pixel. Accordingly, $\text{TRAP}_C$ has the value of $N_C$, and $\text{TRAP}_Y$ has the value of $N_Y$. On the other hand, if the density of a central pixel, $D_P$, is smaller than the density of a surrounding pixel, $D_N$, and the difference between the two values is the same as or less than the threshold value TH, the correction value TRAP is extended while having the density of the central pixel, $D_P$. In this case, the correction values $\text{TRAP}_C$ and $\text{TRAP}_Y$ are adjusted to decrease the density of the colors C and Y that extend into the central pixel P. Thus, ADD_C and ADD_Y, which have positive values, are added to the C and Y values of the TRAP correction values to decrease the density of $\text{TRAP}_C$ and $\text{TRAP}_Y$.

If C and Y have the same type of edge and thus are handled compositely, the total density of C and Y is compared with the density of a central pixel, the values of C and Y are reduced according to the ratio. On the other hand, if the difference between the two values exceeds the threshold value TH, correction is not performed. If color mis-registration correction is performed when the difference in density between a surrounding pixel and a central pixel is great, quality may be deteriorated due to the correction. Therefore, color mis-registration correction is not performed when the difference in density between a surrounding pixel and a central pixel is great.

According to the above-mentioned algorithm, the same pixel in two color images is not corrected with two colors at once. Instead, only one color image is corrected, and thus image quality degradation due to color overlapping may be prevented. The threshold value is secured and stored by measuring the status of image quality through numerous experiments to realize an optimum image quality.

Referring back to FIG. 2, the correction unit 140 corrects each color image data using a correction value set by the controller 130. The correction unit 140 sets the value of the central pixel in the current window using the set correction value. That is, the correction unit 140 may perform color mis-registration correction by enlarging a color image corresponding to a surrounding pixel in a direction of a central pixel as much as a correction value of at least one pixel.

Figure 8:
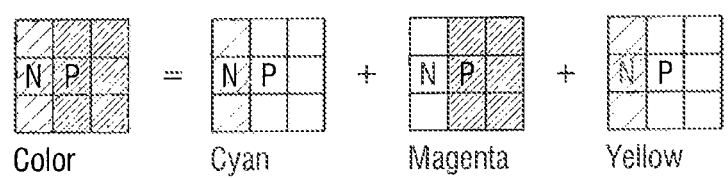
FIG. 8 is a view illustrating image data which has been corrected by comparing a plurality of color images.

FIG. 8 illustrates a correction method when Cyan and Yellow exist on the left line respectively, and Magenta exists at the center and on the right line. According to FIG. 8, since C and Y are located in the same pixel in conformity, they may be handled together in a composite color.

In FIG. 8, C and Y exist only on the left line respectively, and Magenta exists at the center and on the right line. Therefore, the edges of C, Y, and M abut against each other, and the edge directions of C and Y are opposite the edge direction of M. Accordingly, the value P and the value N are compared with each other. In this case, the value N corresponds to the sum of the values of C and Y.

Figure 9:
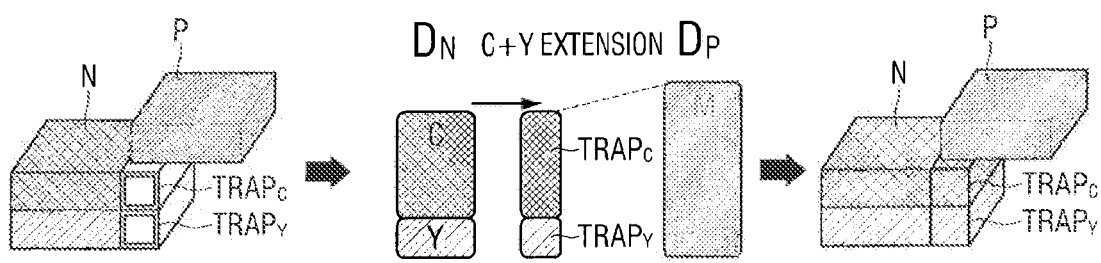
FIGS. 9 to 11 are views to explain a method of determining a correction value and a method for correction by comparing a central pixel with surrounding pixels on a window.
Figure 10:
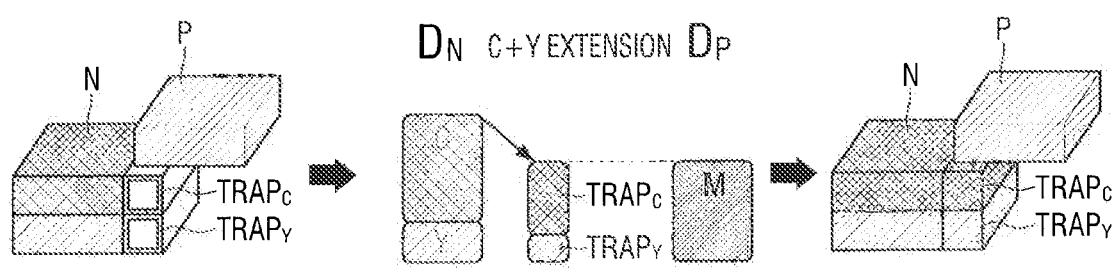
Figure 11:
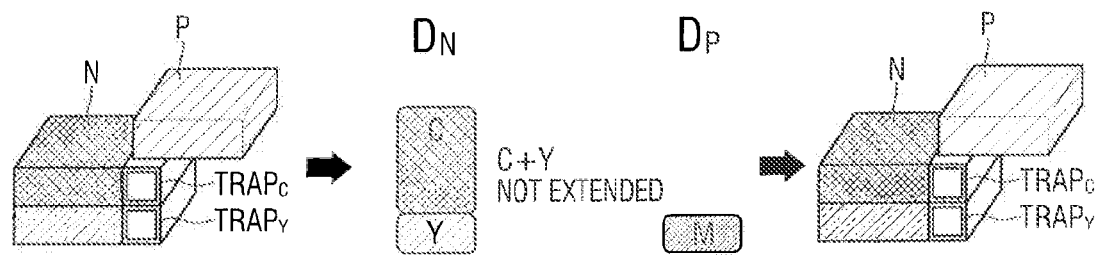

FIGS. 9 to 11 are views to explain a correction method in FIG. 8 in greater detail.

In FIG. 9, $\text{TRAP}_C$ and $\text{TRAP}_Y$ refer to correction values of a central pixel in the color image data C and Y.

If it is determined that C and Y exist in the same surrounding pixel and M exists in the central pixel as illustrated in FIG. 8 after generating a window in the same pixel location of each of a plurality of color image data such as C, M, Y, and K and comparing edges of each color image data, the value M of the central pixel is compared with the values of C and Y of the surrounding pixel.

If it is determined that the value of the central pixel is greater than the value of the surrounding pixel based on the result of comparison as illustrated in FIG. 9, the values of C and Y become $TRAP_C$ and $TRAP_Y$. Accordingly, the central pixels of the color image data C and Y are generated as $TRAP_C$ and $TRAP_Y$. That is, C and Y are extended in the direction of the surrounding pixel towards the central pixel.

FIG. 10 illustrates a case where the value of a surrounding pixel is greater than the value of a central pixel and the difference between the two values is the same as or less than a threshold value. According to FIG. 10, the value of the central pixel becomes the correction value as it is. If there exist both C and Y as illustrated in FIG. 10, each correction value of C and Y are determined according to the ratio of the sum of C and Y versus the value of the central pixel.

FIG. 11 illustrates a case where the value of a surrounding pixel is bigger than the value of a central pixel and the difference between the two values exceeds a threshold value. In this case, correction values $TRAP_C$ and $TRAP_Y$ are set as '0' respectively, and thus correction of the color image data C and Y is not performed. When a previous window or a next window is generated, C and Y correspond to the central pixel and M corresponds to the surrounding pixel in which the value of the central pixel is greater than the value of the surrounding pixel and thus M may be extended towards the direction of the central pixel.

In the examples of FIGS. 9 to 11, the edge of M is the first line edge where color exists only on the middle line as in type 3 of FIG. 5, and if the edge of Y exists on the right line, one of C and Y may be extended towards the direction of the central pixel, which may be set selectively at the time of manufacturing. That is, the color whose image quality is least deteriorated in the case of color overlapping may be set to be extended.

Figure 12:
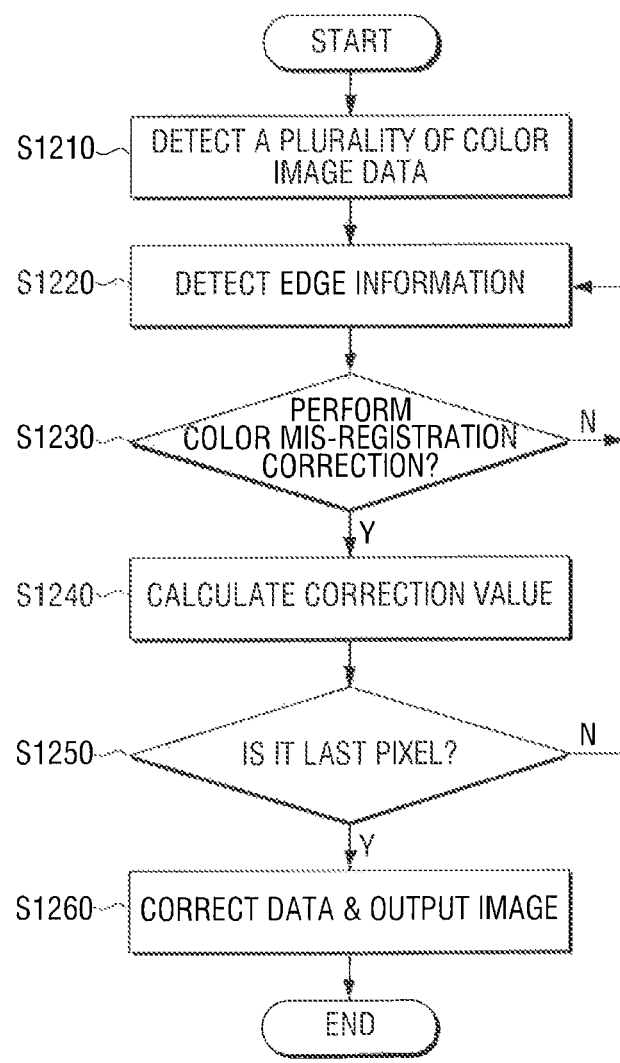
FIG. 12 is a flowchart to explain a method of processing color registration according to an exemplary embodiment.

FIG. 12 is a flowchart to explain a method of processing color registration according to an exemplary embodiment. According to FIG. 12, if a plurality of color image data is detected in operation S1210, edge information is extracted from a window which is applied to each pixel of each color image in operation S1220.

Whether to perform correction is determined in operation S1230 using the edge information in the window. The edge information may include information regarding the location, direction, and type of the edge in the window. For instance, correction may be performed when the edges in the window are located in opposite direction of each other while the edge surfaces are in contact with each other. The window may be generated in various sizes and shapes.

If it is determined to perform correction, a correction value is calculated in operation S1240.

The above process is performed repeatedly for the entire color image. If it is determined in operation S1250 that the correction value for the last pixel of the image is calculated, each color image data is converted in operation S1260 by applying the correction values and image is output according to the converted color image data.

Figure 13:
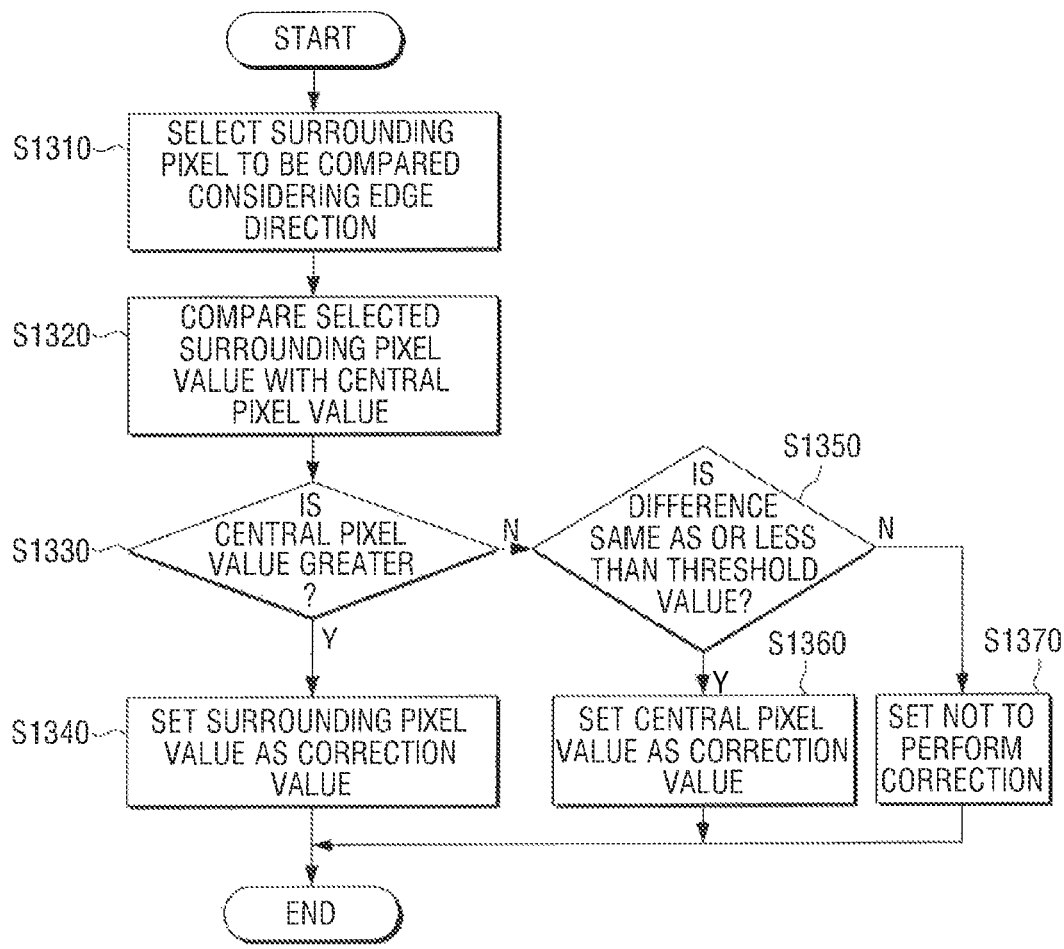
FIG. 13 is a flowchart to explain a method of setting a correction value according to an exemplary embodiment

FIG. 13 is a flowchart to illustrate a method of setting a correction value according to an exemplary embodiment.

According to FIG. 13, a surrounding pixel to be compared is selected in consideration of an edge direction in operation S1310. Specifically, one pixel of a plurality of pixels of an edge in an edge direction with respect to a central pixel is selected as a surrounding pixel as illustrated in FIG. 7.

Accordingly, the value of the selected surrounding pixel and the value of a central pixel are calculated and compared in operation S1320. If it is determined in operation S1330 that the value of the central pixel is higher than the value of the surrounding pixel S1330, the value of the surrounding pixel is set as a correction value in operation S1340. For example, in FIG. 9, color image data of C and Y which corresponds to a surrounding pixel is extended in the direction of P. That is, C and Y pixels in location P may be generated as a correction value.

On the other hand, if the value of the central pixel is greater than the value of the surrounding pixel, it is determined in operation S1350 whether the difference in the two values is the same as or less than a threshold value S1350. If it is determined that the difference is the same as or less than the threshold value, the value of the central pixel is set as a correction value in operation S1360. For example, in FIG. 10, $TRAP_C$ and $TRAP_Y$ are set to have the same value as the value of the central pixel. Accordingly, color image data of C and Y which corresponds to a surrounding pixel is extended towards the central pixel having the same size as $TRAP_C$ and $TRAP_Y$.

Meanwhile, even though the value of the central pixel is greater than the value of the surrounding pixel, if the difference between the two values exceeds the threshold value, it is determined in operation S1370 that correction is not to be performed as illustrated in FIG. 11. As described above, calculation of an edge correction value and correction may be performed effectively by comparing edge pixels.

The method of performing color mis-registration correction according to various examples may be performed by executing a program code stored in various types of recording media which can be readable by a computing terminal such as a personal computer, portable computing device, or other computing terminal.

Specifically, a code for performing the color mis-registration correction may be stored in various types of recording media such as a RAM (Random Access Memory), a flash memory, a ROM (Read Only Memory), an EPROM (Erasable Programmable ROM), an EEPROM (Electronically Erasable and Programmable ROM), a register, a hard-disk, a removable disk, a memory card, a USB memory, and a CD-ROM.

Figure 14A:
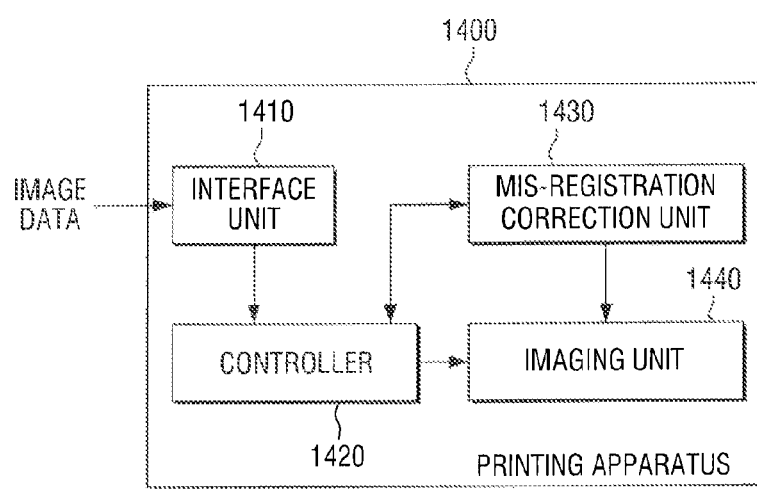
FIGS. 14A to 14C illustrate mis-registration correction units according to embodiments of the present general inventive concept.

FIG. 14A illustrates a printing apparatus 1400 according to another embodiment of the present general inventive concept. The printing apparatus 1400 may be a printer, a multi-function device that includes a printing function, or any other type of image forming apparatus. The printing apparatus 1400 may include an interface unit 1410, a controller 1420, a mis-registration correction unit 1400, and an imaging unit 1440. The interface unit 1410 may receive image data and transmit the image data to the controller 1420. The interface unit 1410 may include data ports including wired and wireless ports, such as antenna, or user input devices to receive input from a user. The data ports may include network ports and any supporting circuitry, device ports to receive connections to external devices, or any other types of interfaces. The interface unit 1410 may receive image data of any format, including print data or other types of image data.

Figure 14B:
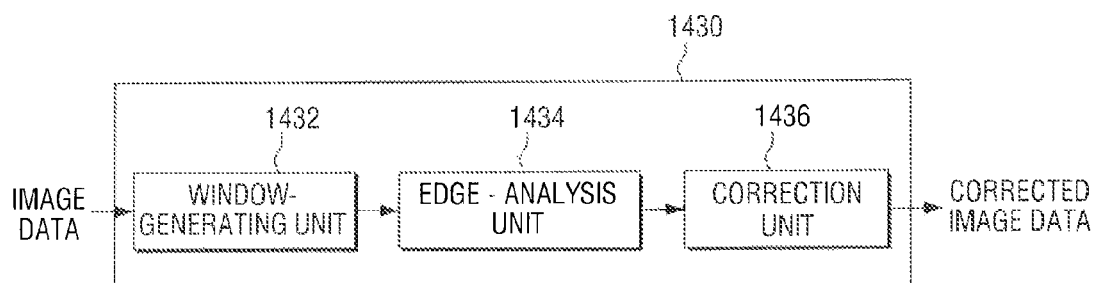

The controller 1420 may receive the data from the interface unit 1410 and determine an appropriate action for the data. The controller 1420 may include memory, processing units, and other logic circuitry to control operations of the printing apparatus. If the controller 1420 determines that the received data corresponds to data to be printed via the imaging unit 1440, the controller may transmit the data to the mis-registration correction unit 1430 to determine whether mis-registration correction is required. The mis-registration correction unit 1430 may correspond to the controller unit 100 described in FIG. 2, above. FIG. 14B illustrates the mis-registration correction unit 1430 according to an alternative embodiment, or describes the mis-registration correction unit 1430 in an alternative manner. The mis-registration correction unit 1430 as illustrated in FIG. 14B may include a window-generating unit 1432, and edge-analysis unit 1434, and a correction unit 1436.

The functions of each of the window-generating unit 1432, the edge-analysis unit 1434, and the correction unit 1436 have been previously described with respect to the edge detection unit 120, the controller 130, and the correction unit 140 of FIG. 2. The window-generating unit 1432, the edge-analysis unit 1434, and the correction unit 1436 may each comprise memory and logic circuitry, or may comprise software code stored in memory and executed by one or more processors and supporting logic circuitry to perform the described functions.

The window-generating unit 1432 may receive image data and may generate a plurality of windows corresponding to the plurality of different colors that make up the image data. The edge-analysis unit 1434 may analyze the color patterns of each of the respective windows to determine whether edges exist, whether the edges abut edges of the other colors, whether the edges of different colors are in the same direction or in different directions, densities of the different colors at the edges, and the other edge information discussed previously with respect to FIGS. 2-13. The correction unit 1436 adjusts correction values to change pixel characteristics of pixels at the edges when it is determined based on the edge analysis that mis-registration has occurred or is likely to occur. The correction unit 1436 may then output corrected image data.

If necessary, the controller 1420 may convert the corrected image data into print data and may output the print data to the imaging unit 1440 to be printed. Alternatively, the imaging unit 1440 may include a converting unit to receive image data and to convert the image data to print data to be printed. In such a case, the mis-registration correction unit 1430 may output the corrected image data directly to the imaging unit 1440.

The mis-registration correction unit 1430 may be an integrated circuit chip, a module comprising one or more processors and memory connectable to a host device or a printing device, or computer code stored in memory and executable by a processor.

Figure 14C:
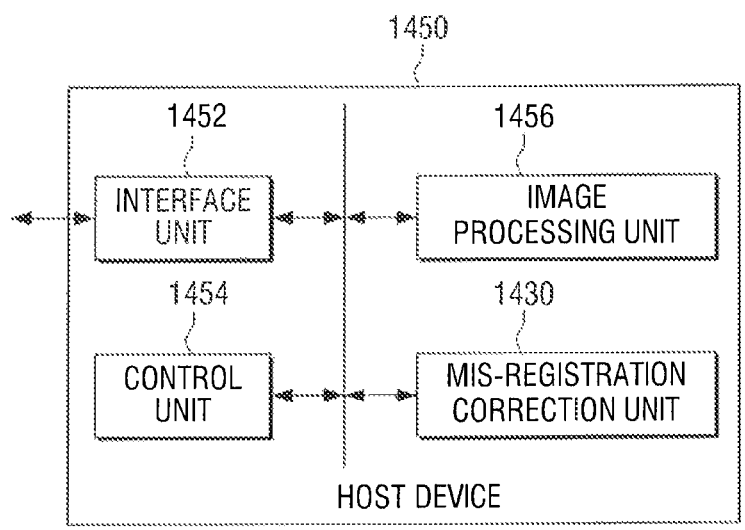

FIG. 14C illustrates a host device 1450 that includes the mis-registration correction unit 1430. The host device 1450 may include an interface unit 1452 to receive data via a data port or via user input, a control unit 1454 to control operations of the host device 1450, an image processing unit 1456 to generate image data and/or print data, and the mis-registration correction unit 1430 to perform mis-registration correction of image data.

The host device 1450 may be a computer terminal, such a personal computer, server, laptop computer, or any other type of computing device. The host device 1450 may receive image data via the interface unit 1452. For example, a storage device, another host device, or a server may transmit image data to the interface unit 1452. The control unit 1454 may detect the image data and may transmit the image data to the image processing unit 1456. If it is determined that the image data is to be printed, the control unit 1454 may transmit the image data to the mis-registration correction unit 1430 for mis-registration correction prior to generating print data or other image data to transmit to a printing device.

The image processing unit 1456 may include one or more processors, or may include code stored in memory and executable by a processor of the host device 1450. For example, the control unit 1454 may include one or more processors, memory, and other logic circuitry to perform the operations of the host device 1450.

Figure 15A:
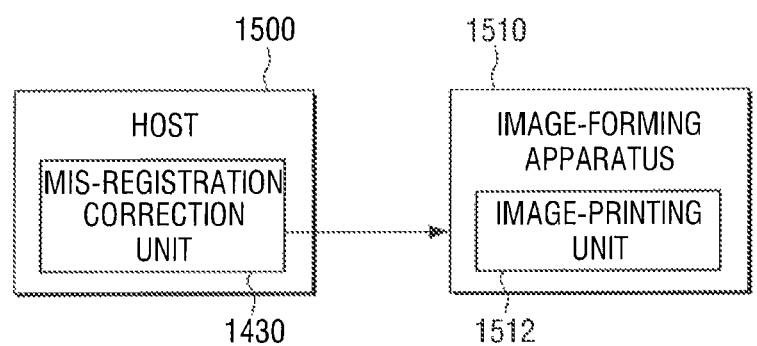
FIGS. 15A and 15B illustrate imaging systems according to embodiments of the present general inventive concept.
Figure 15B:
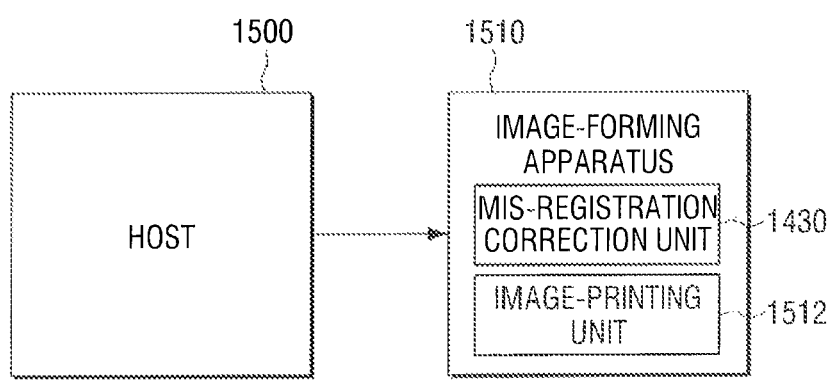

FIGS. 15A and 15B illustrate examples in which the mis-registration correction unit 1430 is located within a host device 1500 and an image-forming apparatus 1510, respectively. In FIG. 15A, the host device 1500 includes the mis-registration correction unit 1430 that corrects mis-registration of image data before transmitting print data to the image-forming apparatus 1510 to be printed by the image-printing unit 1512. On the other hand, FIG. 15B illustrates an image-forming apparatus 1510 that includes both the mis-registration correction unit 1430 and the image-printing unit 1512, described above.

In each case, the host 1500 may be a host computer, such as a user terminal or a server connected to a network. In FIG. 15B, the host 1500 may also be a memory storage device, such as a FLASH drive, or storage disk, that stores image data. When the storage device is connected to the image-forming apparatus 1510, which may be a printer, for example, a controller of the image-forming apparatus 1510 may transmit the image data to the mis-registration correction unit 1430 before printing the image data.

Although a few embodiments of the present general inventive concept have been shown and described, it will be appreciated by those skilled in the art that changes may be made in these embodiments without departing from the principles of the general inventive concept, the scope of which is defined in the appended claims and their equivalents.

What is claimed is:

1. A method of performing color mis-registration correction in an image forming apparatus, comprising:
   detecting a plurality of color image data from print data;
   detecting edge information of each color image pixel for each of the color image data and generating a predetermined size window having a central pixel of each color image by checking window edge information regarding a location, direction and type according to a central pixel-surrounding pixel difference;
   comparing the detected edge information of the central pixel of each color image with each of surrounding pixels and performing color mis-registration correction when there are at least two color images of which edges are in contact with each other and edge directions are opposite to each other;
   when performing the color mis-registration correction, comparing a value of a pixel which constitutes each color image and setting a correction value; and
   when correction values for entire pixels of the each color image are set, performing color mis-registration correction for the plurality of color image data according to the set correction values.

2. The method of claim 1, wherein the edge information includes information regarding an edge location which indicates where edge is located, information regarding a direction that the edge faces, and information regarding an edge type which indicates an edge gradient in the window.

3. The method of claim 1, wherein the performing color mis-registration correction comprises extending a color image corresponding to the surrounding pixel in a direction of the central pixel by as much as one pixel.

4. The method of claim 1, wherein generating the predetermined size window comprises generating a window which has a pixel in a same location with respect to each of the at least two color images as a central pixel,
   wherein setting the correction value comprises:
      comparing a value of the central pixel in a window generated in at least one first color image from among the at least two color images with a value of a surrounding pixel in an edge of a window generated in the other second color image from among the at least two color images; and if the central pixel value is greater than the surrounding pixel value, setting the surrounding pixel value as the correction value, if the central pixel value is less than the surrounding pixel value and difference is a same as or less than a predetermined threshold value, setting the central pixel value as the correction value, and if the central pixel value is less than the surrounding pixel value and difference exceeds the threshold value, determining not to perform correction for the central pixel.

5. An image forming apparatus, comprising:
an engine unit to perform an image forming operation; and
a controller unit to perform color mis-registration correction by correcting a plurality of color image data detected from print data and to provide the corrected color image data to the engine unit,
where the controller unit comprises:
a conversion unit to detect the plurality of color image data from the print data;
an edge detection unit to detect edge information for a pixel of each color image and to generate a predetermined size window having a central pixel of each color image by checking window edge information regarding a location, direction and type according to a central pixel-surrounding pixel difference;
a controller to perform color mis-registration correction when there are at least two color images of which edges are in contact with each other and edge directions are opposite to each other by comparing the detected edge information of the central pixel of each color image with each of surrounding pixels and to set a correction value by comparing a value of a pixel which constitutes each color image; and
a correction unit to correct at least one color image data from among the plurality of color image data according to the set correction value when a correction value for entire pixels of the each color image is set.

6. The image forming apparatus of claim 5, wherein the edge detection unit comprises:
a window generation unit to generate the predetermined size window;
an edge information generation unit to generate the edge information; and
a storage unit to store the generated edge information.

7. The image forming apparatus of claim 6, wherein the edge information includes information regarding an edge location which indicates where edge is located, information regarding a direction which indicates a direction where an edge is generated, and information regarding an edge type which indicates an edge gradient in the window.

8. The image forming apparatus of claim 6, wherein the correction unit performs color mis-registration correction by extending a color image corresponding to the surrounding pixel in a direction of the central pixel by as much as one pixel.

9. The image forming apparatus of claim 6, wherein the window generation unit generates a predetermined size window which has a pixel in a same location with respect to each of the at least two color images as a central pixel,
wherein the controller comprises:
a comparison unit to compare a value of a central pixel in the predetermined size window generated in at least one first color image from among the at least two color images with a value of a surrounding pixel in an edge of the predetermined size window generated in the other second color image from among the at least two color images; and
a setting unit to, if the central pixel value is bigger than the surrounding pixel value, set the surrounding pixel value as the correction value, if the central pixel value is smaller than the surrounding pixel value and difference is a same as or less than a predetermined threshold value, set the central pixel value as the correction value, and if the central pixel value is smaller than the surrounding pixel value and difference exceeds the threshold value, determine not to perform correction for the central pixel.

10. A controller chip to perform color mis-registration correction, comprising:
a conversion unit to detect a plurality of color image data from print data;
an edge detection unit to detect edge information for each pixel of a plurality of color images represented by the plurality of color image data and to generate a predetermined size window having a central pixel of each color image by checking window edge information regarding a location, direction and type according to a central pixel-surrounding pixel difference;
a controller to perform color mis-registration correction when there are at least two color images of which edges are in contact with each other and edge directions are opposite to each other by comparing the detected edge information of the central pixel of each color image with each of surrounding pixels and set a correction value by comparing a value of a pixel which constitutes each color image; and
a correction unit to correct at least one color image data from among the plurality of color image data according to the set correction value if a correction value for entire pixels of each of the plurality of color images is set.

11. The controller chip of claim 10, wherein the edge detection unit comprises:
a window generation unit to generate the predetermined size window;
an edge information generation unit to generate the edge information; and
a storage unit to store the generated edge information.

12. The controller chip of claim 11, wherein the edge information includes information regarding an edge location which indicates where the edge is located, information regarding a direction which indicates a direction that the edge faces, and information regarding an edge type which indicates an edge gradient in the window.

13. The controller chip of claim 11, wherein the window generation unit generates a predetermined size window which has a pixel in a same location with respect to each of the at least two color images as a central pixel,
wherein the controller comprises:
a comparison unit to compare a value of a central pixel in the predetermined size window generated in at least one first color image from among the at least two color images with a value of a surrounding pixel in an edge of the predetermined size window generated in the other second color image from among the at least two color images; and
a setting unit to, if the central pixel value is greater than the surrounding pixel value, set the surrounding pixel value as the correction value, if the central pixel value is less than the surrounding pixel value and difference is a same as or less than a predetermined threshold value, set the central pixel value as the correction value, and if the central pixel value is less than the surrounding pixel value and difference exceeds the threshold value, determine not to perform correction for the central pixel.

14. A non-transitory computer-readable recording medium to store a code to execute a method of color mis-registration correction, the method comprising:
   detecting edge information of each color image pixel for each of a plurality of color images and generating a predetermined size window having a central pixel of each color image by checking window edge information regarding a location, direction and type according to a central pixel-surrounding pixel difference;
   comparing the detected edge information of the central pixel of each color image with each of surrounding pixels and performing color mis-registration correction when there are at least two color images of which edges are in contact with each other and edge directions are opposite to each other;
   when it is determined to perform the color mis-registration correction, comparing a value of a pixel which constitutes each color image and setting a correction value; and
   when correction values for entire pixels of each of the plurality of color images are set, performing color mis-registration correction for at least one color image from among the plurality of color images according to the set correction values.

15. The recording medium of claim 14,
   wherein the generating the predetermined size window comprises generating a predetermined size window which has a pixel in a same location with respect to each of the at least two color images as a central pixel, and
   wherein the setting a correction value comprises:
   comparing a value of a central pixel in a window generated in at least one first color image from among the at least two color images with a value of a surrounding pixel in an edge direction in a window generated in the other second color image from among the at least two color images; and
   if the central pixel value is greater than the surrounding pixel value, setting the surrounding pixel value as the correction value, if the central pixel value is less than the surrounding pixel value and difference is a same as or less than a predetermined threshold value, setting the central pixel value as the correction value, and if the central pixel value is less than the surrounding pixel value and difference exceeds the threshold value, determining not to perform correction for the central pixel.

16. A method of performing mis-registration correction, comprising:
   generating from image data a predetermined size window having a plurality of pixels, the image data including image data of a plurality of colors such that combined color images of the respective plurality of colors make up the image data and have a central pixel of each color image by checking window edge information regarding a location, direction and type according to a central pixel-surrounding pixel difference;
   comparing edge information of at least two different colors of the plurality of colors in the window; and
   performing mis-registration correction on at least one pixel of at least one of the different colors when there are at least two color images of which edges are in contact with each other and edge directions are opposite to each other.

17. The method of claim 16, wherein comparing the edge information includes comparing a value of a base pixel in the window with a value of an adjacent pixel of a different color.

18. The method of claim 17, wherein the base pixel and the adjacent pixel are each located on edges of different colors.

19. The method of claim 16, wherein performing mis-registration correction comprises:
   setting a value of the adjacent pixel as a correction value at which to extend the color of the adjacent pixel into the base pixel when the base pixel value is greater than the adjacent pixel value;
   setting the base pixel value as the correction value at which to extend the color of the adjacent pixel into the base pixel when the base pixel value is less than the adjacent pixel value and a difference between the base pixel value and the adjacent pixel value is the same as or less than a predetermined threshold value; and
   determining not to perform mis-registration correction when the base pixel value is less than the adjacent pixel value and a difference between the base pixel value and the adjacent pixel value exceeds the threshold value.

20. The method of claim 19, wherein each of the base pixel value and the adjacent pixel value corresponds to a respective color density.

21. A mis-registration correction apparatus, comprising:
   an edge detection unit to generate from image data a window having a plurality of pixels, the image data including image data of a plurality of colors such that combined color images of the respective plurality of colors make up the image data, to compare edge information of at least two different colors of the plurality of colors in the window and to generate a predetermined size window having a central pixel of each color image by checking window edge information regarding a location, direction and type according to a central pixel-surrounding pixel difference; and
   a correction unit to perform mis-registration correction on at least one pixel of at least one of the two different colors when there are at least two color images of which edges are in contact with each other and edge directions are opposite to each other.

22. The mis-registration correction apparatus of claim 21, wherein the edge detection unit compares a value of a base pixel located at an edge of one color in the window with a value of an adjacent pixel located at an edge of a different color.

23. The mis-registration correction apparatus of claim 22, wherein the edge detection unit compares at least one of an edge location, a direction of an edge, and a type of an edge of the two different colors.

24. The mis-registration correction apparatus of claim 21, wherein the correction unit sets a value of the adjacent pixel as a correction value at which to at which to extend the color of the adjacent pixel into the base pixel when the base pixel value is greater than the adjacent pixel value, sets the base pixel value as the correction value at which to extend the color of the adjacent pixel into the base pixel when the base pixel value is less than the adjacent pixel value and a difference between the base pixel value and the adjacent pixel value is the same as or less than a predetermined threshold value, and determines not to perform mis-registration correction when the base pixel value is less than the adjacent pixel value and a difference between the base pixel value and the adjacent pixel value exceeds the threshold value.

25. The mis-registration correction apparatus of claim 24, wherein each of the base pixel value and the adjacent pixel value corresponds to a respective color density.

* * * * *